Jan. 22, 1957 H. J. PAUL, JR 2,778,599
PARACHUTE INFLATING MEANS
Filed Jan. 16, 1953

INVENTOR.
HERMAN J. PAUL, JR.
BY
McMorrow, Berman + Davidson
ATTORNEYS

United States Patent Office 2,778,599
Patented Jan. 22, 1957

2,778,599

PARACHUTE INFLATING MEANS

Herman J. Paul, Jr., Zanesville, Ohio

Application January 16, 1953, Serial No. 331,690

3 Claims. (Cl. 251—66)

This invention relates to an inflating means, and more particularly to an inflating means for a parachute.

An object of the present invention is to provide an inflating means for a parachute which is certain and practically instantaneous in operation.

Another object of the present invention is to provide an inflating means which may be adjusted to predetermined settings to regulate the volume of air, gas or other inflating medium to be discharged.

Other objects and advantages of the present invention will become apparent from the following description taken in conjunction with the accompanying drawings, in which.

Figure 1:
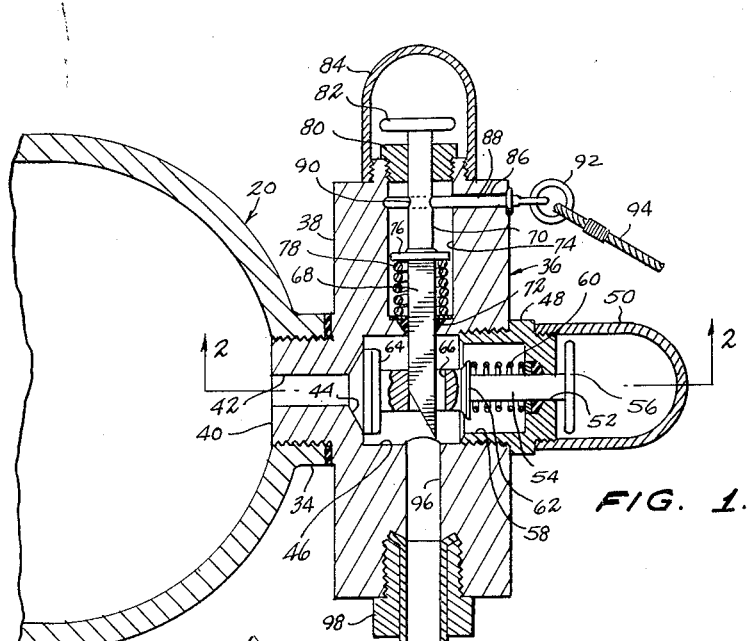
Figure 1 is a sectional view taken through the inflating means of the present invention.
Figure 2:
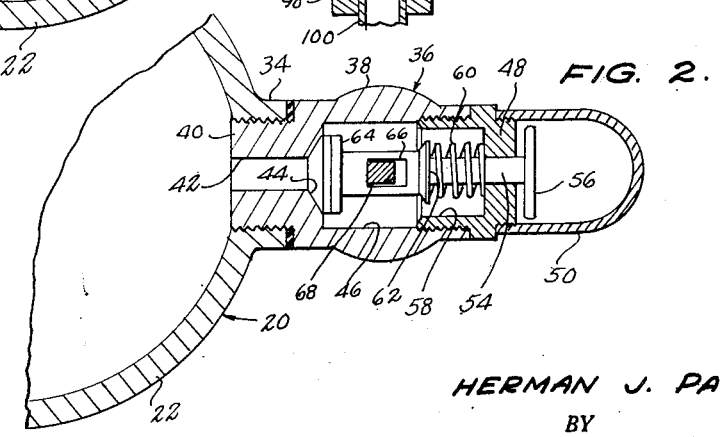
Figure 2 is a sectional view taken on the line 2—2 of Figure 1.

Referring to the drawings, the numeral 20 designates an inflating means which includes a cylinder 22 holding a suitable quantity of an inflating medium, such as gas, in a compressed state. At one end, a filler check valve is mounted on the cylinder, and the cylinder can be recharged with the inflating medium after each use, through this valve. This valve can be of any suitable type and can be placed anywhere on the cylinder, as may be desired.

A short, cylindrical neck 34 at the mouth end of the cylinder is interiorly threaded for connection thereto of a valve assembly generally designated at 36. Valve assembly 36 includes a relatively elongated body 38 formed integrally, medially between its ends, with a laterally extended inlet projection 40 having a bore 42 extending into communication at one end with the interior of the cylinder. The other end of the bore opens upon a tapered valve seat 44 provided at one end of a valve chamber 46.

The chamber 46, at that end thereof remote from the valve seat, opens upon the outer surface of the valve body and is threaded to engage a volume control adjusting bushing 48. Bushing 48 is exteriorly threaded at its outer end to receive a domed protective cap 50.

Formed centrally in the bushing is a valve stem bore 52 and slidable in said bore is a valve stem 54 aligned coaxially with the cylinder neck and the valve seat. The valve stem has one end projecting out of the bushing and equipped with a depressible thumb button 56.

In the inner end of the bushing 48, I form a deep recess 58. A spring 60 is circumposed about stem 54 in said recess and is engaged at one end against a collar 62 rigid with the stem. The spring is engaged at its other end against the inner end wall of recess 58 and is normally held under compression. The bushing 48 serves as a means for adjusting the spring tension, for a purpose to be made presently apparent.

That end of the stem remote from the button 56 is formed with a valve disc 64 normally disposed against seat 44, and between the valve disc and the collar 62, I provide a non-circular transverse opening 66 in the stem into which extends the tapered inner end 68 of a lock pin 70, said inner end 68 being of non-circular cross section and being slidable in a lock pin bore 72 of complementary cross section that opens into a counterbore 74 formed in one end of the valve body. A collar 76 rigid on lock pin 70 engages one end of a coil spring 78 circumposed about the lock pin and normally held under compression in counterbore 74, between said collar 76 and the inner end wall of the counterbore.

At its outer end, pin 70 slides in the axial bore of a lock pin bushing 80 threaded into counterbore 74. A thumb button 82 on said outer end is protectively enclosed by a domed cap 84 threaded onto the bushing.

In the valve body 38, adjacent bushing 80, a transverse bore 86 communicating with counterbore 74 has a release pin 88 sliding therein, said pin 88 being normally engaged at its inner end in a transverse aperture 90 of the lock pin. The outer end of the release pin has an eye through which extends a ring 92 connected to a rip cord 94.

The pin 88, of course, is freely slidable in bore 86 to permit its being readily retracted and if desired, the neck 34 of the cylinder might well be formed with a 90 degree bend, to so locate the valve assembly 36 as to dispose the pin 88 in the normal line along which the rip cord is pulled from below.

That end of the valve body remote from the lock pin 70 has a discharge passage 96 aligned coaxially with the lock pin at right angles to the valve stem. The discharge passage communicates at one end with valve chamber 46 and at its other end with a connecting fitting 98 threaded into the valve body and adapted to connect to the body, in communication with the discharge passage, one end of a flexible tube 100. The tube 100 provides flow communication with an inflatable canopy portion of the parachute.

In use, the parts will normally appear as shown in Figure 1. When, however, the rip cord is pulled, the release pin 88 will disengage from lock pin 70. Spring 78, now free to expand, will shift lock pin out of engagement with valve stem 54. The valve stem spring 60, which normally urges the valve stem toward seat 44, will be overcome by the pressure of the compressed gas or other inflation medium seeking escape from the cylinder, and valve disc 64 will be unseated. The inflating medium will thus flow into chamber 46 and thence into the inflatable canopy portion, through discharge passage 96 and tube 100, reducing measurably the time required for opening the parachute.

The re-setting of the device is of course readily accomplished by deflating the main canopy portion, depressing button 56, depressing button 82, re-inserting release pin 88, and rechanging cylinder 22 through a filler valve.

It is important to note that the bushing 48 is so arranged as to permit predetermined settings to be made, whereby the tension of the spring can be regulated relative to the opposing pressure of the inflating medium, thus to effect, in turn, adjustment of the total volume of flow of the inflating medium when the valve is opened.

What is claimed is:

1. In an inflating means for a parachute, a valve body having a chamber therein, said body being provided with an inlet extending inwardly from one side intermediate the ends thereof and communicating with said chamber and adapted to be connected to a source of gas under pressure, there being a discharge passage in said body extending inwardly from one end thereof and in communication with said chamber, a valve disc in said chamber and normally seating upon a seat provided on the end of said inlet communicating with said chamber, a stem extending transversely through said chamber and having one end fixed to said disc, said stem being mounted in said body for movement of said valve disc into and out of seating engagement with said seat, a lock pin positioned within said body intermediate said chamber and the other end of said body and extending slidably through a non-circular transverse opening in said stem and mounted in said body for movement into and out of engagement with the transverse opening in said stem, and means releasably engaging said lock pin and operable exteriorly of said body for holding said pin in engagement with the transverse opening in said stem.

2. In an inflating means for a parachute, a valve body having a chamber therein, said body being provided with an inlet extending inwardly from one side intermediate the ends thereof and communicating with said chamber and adapated to be connected to a source of gas under pressure, there being a discharge passage in said body extending inwardly from one end thereof and in communication with said chamber, a valve disc in said chamber and normally seating upon a seat provided on the end of said inlet communicating with said chamber, a stem extending transversely through said chamber and having one end fixed to said disc, said stem being mounted in said body for movement of said valve disc into and out of seating engagement with said seat, a lock pin positioned within said body intermediate said chamber and the other end of said body and extending slidably through a non-circular transverse opening in said stem and mounted in said body for movement into and out of engagement with the transverse opening in said stem, spring means operatively connected to said stem for urging said valve disc into seating engagement with said seat and means releasably engaging said lock pin and operable exteriorly of said body for holding said pin in engagement with the transverse opening in said stem.

3. In an inflating means for a parachute, a valve body having a chamber therein, said body being provided with an inlet extending inwardly from one side intermediate the ends thereof and communicating with said chamber and adapted to be connected to a source of gas under pressure, there being a discharge passage in said body extending inwardly from one end thereof and in communication with said chamber, a valve disc in said chamber and normally seating upon a seat provided on the end of said inlet communicating with said chamber, a stem extending transversely through said chamber and having one end fixed to said disc, said stem being mounted in said body for movement of said valve disc into and out of seating engagement with said seat, a lock pin positioned within said body intermediate said chamber and the other end of said body and extending slidably through a non-circular transverse opening in said stem and mounted in said body for movement into and out of engagement with the transverse opening in said stem, spring means operatively connected to said stem for urging said valve disc into seating engagement with said seat, spring means operatively connected to said lock pin for urging the latter out of engagement with the transverse opening in said stem, and means releasably engaging said lock pin and operable exteriorly of said body for holding said pin in engagement with the transverse opening in said stem.

References Cited in the file of this patent

UNITED STATES PATENTS

| | | |
|---|---|---|
| 390,533 | Toepfer | Oct. 2, 1888 |
| 1,497,946 | Schmidt | June 17, 1924 |
| 1,733,732 | Henvis | Oct. 29, 1929 |
| 1,840,618 | Castner | Jan. 12, 1932 |
| 1,861,784 | Brown | June 7, 1932 |
| 1,903,213 | Gleason | Mar. 28, 1933 |
| 2,013,495 | Kennedy | Sept. 3, 1935 |
| 2,285,655 | Heinemann | June 9, 1942 |
| 2,349,833 | Robinson | May 30, 1944 |
| 2,641,424 | Moran | June 9, 1953 |

FOREIGN PATENTS

| | | |
|---|---|---|
| 475,327 | Great Britain | of 1937 |